United States Patent [19]

Nagano et al.

[11] Patent Number: 4,777,051

[45] Date of Patent: Oct. 11, 1988

[54] PROCESS FOR THE PRODUCTION OF A COMPOSITION FOR ANIMAL FEED

[75] Inventors: Yoshimi Nagano; Hiroshi Fukushi; Takafumi Tosa; Masayoshi Naruse; Shigeho Ikeda, all of Kawasaki, Japan

[73] Assignee: Ajinomoto Co., Inc., Tokyo, Japan

[21] Appl. No.: 42,297

[22] Filed: Apr. 24, 1987

[30] Foreign Application Priority Data

Jun. 20, 1986 [JP] Japan ................. 61-144259

[51] Int. Cl.$^4$ ................. A23K 1/00
[52] U.S. Cl. ................. 426/61; 426/471; 426/520; 426/656
[58] Field of Search ........... 426/61, 648, 656, 471, 426/520

[56] References Cited

U.S. PATENT DOCUMENTS

| | | | |
|---|---|---|---|
| 2,710,810 | 6/1955 | Strashun | 426/471 |
| 3,415,665 | 12/1968 | Hussman | 426/471 |
| 3,932,671 | 1/1976 | Yokotsuka | 426/61 |
| 3,956,521 | 5/1976 | Pisecky et al. | 426/471 |
| 3,963,837 | 6/1976 | Maubois et al. | 426/471 |
| 4,099,982 | 7/1978 | Hansen et al. | 426/471 |
| 4,265,702 | 5/1981 | Prudhon et al. | 426/471 |
| 4,552,775 | 11/1985 | Baeline et al. | 426/471 |

*Primary Examiner*—R. B. Penland
*Attorney, Agent, or Firm*—Oblon, Fisher, Spivak, McClelland & Maier

[57] ABSTRACT

A process for production of a composition for animal feed, which comprises
spray drying a solution containing 5–95 wt. % based on the solids content of a solution of tryptophan or threonine, or a concentrate thereof, to make sprayed granules in a semi-dry state,
depositing said spray granules in a mat form, and
hot air drying said granules to produce granules having a water content of about 4 wt. % or less.

9 Claims, No Drawings

PROCESS FOR THE PRODUCTION OF A COMPOSITION FOR ANIMAL FEED

BACKGROUND OF THE INVENTION

1. Field of the Invention

The present invention relates to a process for production of a composition which may be used to prepare animal feed.

2. Discussion of the Background

Tryptophan and threonine (Trp and Thr, respectively, herein) are essential amino acids for animals which may be produced by chemical or biochemical processes.

As one of the biochemical processes which may be used to produce these amino acids, a process is known wherein a microorganism having an ability to produce tryptophan or threonine is cultured with sugars, etc. as the main carbon source and ammonia, etc. as the main nitrogen source so as to produce Trp or Thr. Trp or Thr is isolated from the culture liquor and then subjected to crystallization to isolate Trp or Thr in crystal form, the crystals are dried on a conical drier, a fluidized drier, etc. and used in animal feed.

While the prior art has recognized that Trp or Thr may be added to an animal feed in a purified form, there has been no report regarding a process in which a solution containing large amounts of impurities is directly dried without isolating and purifying Trp or Thr to produce a composition for animal feed.

Although the addition Trp or Thr in a crude form which is not isolated and purified, may be considered to be desirable since the composition to which Trp or Thr is to be added is itself extremely vaguely defined, and even when Trp or Thr are added in conjunction with impurities such as sugars, salts, organic acids, etc., these amino acids can still exhibit their nutritional characteristics in a similar fashion to the isolated and purified ones, there are a number of problems associated with preparation of a composition from impure Trp or Thr. When an impure solution of Trp or Thr is dried by a conventional spray drier, the impurities being microscopic ones such as sugars, salts, organic acids, etc., a large amount of the Trp or Thr and other materials become stuck to the apparatus wall or to a separating cyclone. Thus, normal drying cannot be effected under these conditions. When impure Trp or Thr is dried in a drum drier, decomposition due to heat degeneration takes place. Further, since the water content in the product is increased, stability is lowered and other problems occur such as poor miscibility with animal feeds, based on the physical properties of the powder, such as cohesiveness, etc. On the other hand, although there exist other drying means which might be compatible with impure solutions of Trp or Thr such as freeze-drying, vacuum drying, etc., and which are capable of reducing heat degeneration, there is still an economical problem since the production cost using these methods is quite high.

Therefore, a method has been sought for producing a composition for animal feed by drying a Trp or Thr solution, which can produce a product having excellent stability and powder physical characteristics, with minimum decomposition due to heat degeneration and at a low cost. Thus, there remains a need for new methods of preparing compositions for animal feed based on drying a solution of Trp or Thr containing impurities.

SUMMARY OF THE INVENTION

Accordingly, it is an object of the present invention to provide a process for producing a composition for animal feed using an impure or crude solution of Trp or Thr.

It is another object of the present invention to provide a process for producing a composition for animal feed, based on a crude or impure solution of Trp or Thr, which is capable of producing a product having excellent stability and physical powder properties along with minimum decomposition.

It is yet another object of the present invention to provide a process for the preparation of a composition for animal feed containing Trp or Thr which is characterized by a low cost.

It is yet another object of the present invention to provide a process for producing a composition for animal feed utilizing an impure or crude solution of Trp or Thr, wherein the solution of Trp or Thr is a culture medium of the microorganism which is used to produce the Trp or Thr solution, a resin adsorption eluate, a crystallization mother liquor, or an enzymatic reaction mixture.

According to the present invention, the foregoing and other objects of the present invention have been obtained by a process comprising spray-drying a solution containing 5-95% based on the solids content of the solution of Trp or Thr, or a concentrate thereof, to make sprayed granules in a semi-dry state, depositing these sprayed granules in a mat form having an appropriate thickness, and hot air drying these granules to make granules having a water content of about 4% or less.

DETAILED DESCRIPTION OF THE PREFERRED EMBODIMENTS

The present inventors have intensively studied drying methods of various Trp or Thr solutions such as microorganism culture media, resin adsorption eluates, etc., and, as a result, have discovered that by making a concentrate thereof into sprayed granules in a semi-dry state by spray drying, a product having excellent stability and powder physical properties may be produced at a low cost. Thus, the present invention was accomplished.

The process for production of a composition for animal feed according to the present invention is characterized by spray drying a solution containing 5-95 wt. % based on the solids content in the solution of Trp or Thr, or a concentrate thereof, to make sprayed granules in a semi-dry state, depositing the sprayed granules in a mat form having an appropriate thickness, and hot air drying these sprayed granules in a mat form to make granules having a water content of about 4% or less.

The Trp or Thr solution according to the present invention may be any solution containing 5-95%, preferably 20-60 wt. %, based on the solids content in the solution, of Trp or Thr. Such solutions include culture media of microorganisms, a cell-free preparation of a culture media of microorganisms, resin adsorption eluates, crystallization mother liquors, enzymatic reaction mixtures, etc.

By a "culture medium of microorganisms", is meant a liquid medium used to propagate any microorganism which uses Trp or Thr to grow or produces Trp or Thr during growth. The Thr or Trp may be added directly to the medium in advance of or during culturing of the microorganism, or the Thr or Trp may be produced by the microorganism itself such that the concentration of one or both of these amino acids is increased in the medium in comparison with the original culture medium. Examples of specific suitable microorganism culture media may be found in the examples herein. The medium which may be used in the process of the present invention may contain the microorganism cells or may be a cell free preparation wherein the cells of the microorganisms have been removed by any method standard in the art.

By "resin adsorption eluate", is meant an eluate containing material initially adsorbed onto a resin, wherein the adsorbed material is derived from a solution containing Trp or Thr and the resin is capable of adsorbing these amino acids. The solution containing Thr or Trp which is passed over the resin is not specifically limited, and may be any solution generally which contains these amino acids. Specific examples of resin adsorption eluates may be found in the examples herein.

By "crystallization mother liquors", is meant a solution containing Thr or Trp which has been used to crystallize one or both of these amino acids therefrom. Such a solution is known to contain some residual content of Thr or Trp along with other impurities.

By "enzymatic reaction mixtures", is meant a liquid medium containing one or more enzymes along with free Thr or Trp, and is not otherwise specifically limited. Examples of such enzymes may be purified or partially purified enzymes involved in the biosynthesis of Thr or Trp.

When the Trp or Thr solution contains an organic acid such as lactic acid which is normally contained in fermentation liquors, but which does not evaporate during the drying step, the hygroscopicity of the product will be increased. In such a case, the hygroscopicity of the product may be lowered by adding calcium hydroxide to render the pH of the solution between 8 and 10, preferably between 8.5 and 9.5, and drying the resulting solution.

If the solution has a Trp or Thr content of less than 5 wt. % based on the solids content therein, the practical value of using such a solution is low in view of the cost, whereas if the Thr or Trp content reaches a high purity such as more than 95 wt. %, the merit of the process of the present invention is reduced.

The Trp or Thr solution may be concentrated as required to such an extent that the solids content in the solution is 30-70 wt. %, preferably 40-60 wt. %. The concentration is preferably conducted at as low a temperature and pressure as possible in order to prevent heat degeneration or decomposition of Trp or Thr, etc. during the course of the concentration.

The drying is conducted in two steps. The first step is a spray drying step wherein the Trp or Thr solution or a concentrate thereof is sprayed in a spray drying chamber to make spray granules in a semi-dry state. Second, an air stream bed drying step is conducted wherein the spray granules are deposited on, for example, a belt conveyor of a screen mesh type to form a mat of an appropriate thickness, and the granules are dried with hot air until the water content of the granules is about 4% or less. The thus obtained granules are then cooled to give a product.

While the operating conditions may vary depending upon the concentration of the solution and the amount of impurities, the amount of stock solution to feed and the hot air temperature are controlled so that the sprayed particles form a granular mat of a thickness of 5-30 mm on the belt. If the amount of the feed and the hot air temperature are not appropriate and the particles deposited on the mat do not have appropriate water content and viscosity, the particles will be too densely packed and will thus prevent discharge of the air, whereas if the water content is too much and hence the viscosity is too high, integration of the particles takes place and this also prevents discharge of the drying air. Accordingly, the water content of the sprayed granules obtained by spray drying is controlled to 5-15%, preferably 7-9%. Further, the drying of the deposited sprayed granules is conducted under mild conditions using hot air at as low a temperature as possible, preferably 50°-80° C., over a prolonged period of time.

The apparatus for effecting the drying may preferably be a commercially available filter mat drier. By using a filter mat drier, the above described spray drying and air stream bed drying may be effected continuously. Therefore, it is possible to effectively dry the Trp or Thr solution containing impurities such as hygroscopic sugars, salts, organic acids, etc., such as culture media for microorganisms, resin adsorption eluates, crystallization mother liquors, enzymatic reaction mixtures, etc. The filter mat drier enables instantaneous drying at a high temperature in a spray drying mode during a constant rate drying period in the initial drying period, thereby rapidly removing the water content from the treated solution with a high heat efficiency, and thereafter mild drying is effected at a low temperature over a prolonged period of time in an air stream bed drying mode using a net-formed conveyor belt during the reduced rate drying period. Therefore, even the materials most susceptible to heat degeneration such as Trp and Thr solutions may be dried so that heat degeneration is negligible.

The invention now being generally described, the same will be better understood by reference to certain specific examples which are included herein for purposes of illustration only and are not intended to be limiting of the invention or any embodiment thereof, unless specified.

EXAMPLES

EXAMPLE 1

A seed medium having the composition set forth in Table 1 was charged in an amount of 3 kl (kiloliters) into a seed vessel (tank) sterilized; then 3 l of a pre-seed liquor in which ATCC 21269 described in Japanese Patent Publication No. 3036/1980 had previously been cultured, was added thereto, and culture was effected with an aeration of ½V Vm, at a rotation of 180 rpm and at a temperature of 31.5° C. for 24 hours. When the growth of the cells in the seed vessel (tank) reached the predetermined cell amount, 57 kl of the main medium in Table 1 was sterilized by a continuous sterilizer, transferred to a main culture tank, and culture was effected with an aeration of ½V Vm, a rotation of 82 rpm and a temperature of 31.5° C. For pH control of the culture liquor, ammonia water was used. After the culture had proceeded halfway, a glucose solution was continuously supplied, and 70 kl of a fermentation liquor containing 20 g/l of threonine was obtained.

70 kl of this fermentation liquor was concentrated 3.5-fold using an LTV evaporation apparatus under conditions of reduced pressure and a product temperature of 60° C. or below, to obtain 20 kl of the concentrate.

This concentrate was dried by a filter mat drier Model FMD-20 to a water content of 2.5%. The drying was effected at an amount of the stock solution to feed of 450 l/hr and a hot air temperature of 115° C. in order to minimize heat degeneration and obtain a granule product.

The granular threonine composition thus obtained had more or less the same threonine content based on the total solids therein as the threonine content based on the total solids in the fermentation liquor, had undergone almost no heat degeneration and also hardly showed any increase in the degree of discoloration.

TABLE 1

| Component | Seed Medium | Main Medium |
|---|---|---|
| Glucose | 3 g/dl | 13 g/dl |
| Urea | 0.3 g/dl | 4.5 g/dl |
| KH$_2$PO$_4$ | 0.15 g/dl | 0.15 g/dl |
| MgSO$_4$.7H$_2$O | 0.04 g/dl | 0.04 g/dl |
| FeSO$_4$.7H$_2$O | 1 mg/dl | 1 mg/dl |
| MnSO$_4$.4H$_2$O | 1 mg/dl | 1 mg/dl |
| Thiamine hydrochloride | 1000 μg/l | 1000 μg/l |
| Biotin | 100 μg/l | 100 μg/l |
| Soybean protein hydrochloric acid hydrolysate | 0.5 ml/dl | 1.0 ml/dl |
| Anti-foaming agent | — | 20 mg/dl |
| pH (neutralized with KOH) | 7.2 | 7.2 |

EXAMPLE 2

2 kl of the threonine fermentation liquor obtained in Example 1 was adjusted to pH 1 with hydrochloric acid, then the cells were removed by subjecting the liquor to centrifugation in a centrifugal separator, and 1.2 kl of the cell-deprived liquor was fed onto a resin column packed with 1.2 kl of a cation exchange resin at a rate of 1.2 kl/hr. 1.2 kl of water was forced therethrough, and reverse washing was effected with 2.4 kl of water. Thereafter, 2.4 kl of 1 N ammonia water was fed at a rate of 1.2 kl/hr, to obtain 1.8 kl of a threonine eluate.

This eluate was concentrated 3-fold to obtain 600 l of the concentrated eluate. The concentration was conducted using an LTV concentrating apparatus under conditions of reduced pressure and a product temperature of 60° C. or below.

This concentrate was dried in a similar manner as in Example 1 using a filter mat drier Model FMD-20 to a water content of 2.0%, to obtain a granular product without heat degeneration.

EXAMPLE 3

A seed medium havng the composition set forth in Table 2 was charged in an amount of 3 kl into a seed vessel (tank), sterilized; 3 l of a pre-seed liquor in which FERM BP-202, described in Japanese Patent Publication No. 094391/1983, had previously been cultured was added thereto, and culture was effected with an aeration of ½V Vm, at a rotation of 180 rpm, and at a temperature of 31.5° C. for about 24 hours. When the growth of the cells in the seed vessel (tank) reached the predetermined cell amount, 57 kl of the main medium set forth in Table 2 was sterilized by a continuous sterilizer, transferred to a main culture tank, and cultured with an aeration of ½V Vm, at a rotation of 82 rpm and a temperature of 31.5° C. The pH control of the culture liquor was effected with ammonia water. When the culture had proceeded halfway, a sugar solution was continuously supplied, to obtain 70 kl of a fermentation liquor containing 2 g/dl of tryptophan.

TABLE 2

| Component | Seed Medium | Main Medium |
|---|---|---|
| Glucose | 3.0 g/dl | 138 g/dl |
| KH$_2$PO$_4$ | 0.05 g/dl | 0.1 g/dl |
| MgSO$_4$.7H$_2$O | 0.04 g/dl | 0.04 g/dl |
| MnSO$_4$.4H$_2$O | 0.001 g/dl | 0.001 g/dl |
| FeSO$_4$.7H$_2$O | 0.001 g/dl | 0.001 g/dl |
| NH$_4$Cl | 0.3 g/dl | 1 g/dl |
| RNA | 0.25 g/dl (KCl) | 0.2 g/dl |
| Soybean protein hydrochloric acid hydrolysate | 65 mg/dl | 0.1 g/dl |
| Anti-foaming agent (soybean oil) | 0.001 g/dl | 0.01 ml/dl |
| pH (neutralized with KOH) | 7.0 | 7.0 |

5 kl of the above-described tryptophan fermentation liquor was adjusted to pH 2, then the cells were removed by subjecting the liquor to centrifugation in a centrifugal separator, and the cell-deprived liquor was fed onto a resin column packed with 1.4 kl of cation exchange resin at a rate of 1.4 kl. 1.4 kl of water was forced therethrough, and reverse washing was effected with 2.8 kl of water. 15 kl of 0.2N ammonia water was fed at a rate of 1.4 kl/hr, to obtain 13 kl of a tryptophan eluate.

This eluate was adjusted to pH 5 with hydrochloric acid, concentrated and crystallized, to obtain 68 kg of tryptophan crystals and 1.2 kl of a crystallization mother liquor.

This crystallization mother liquor was dried in a manner similar to that in Example 1 using a filter mat drier Model FMD-20 to a water content of 2.0%, to obtain a granular product without heat degeneration.

EXAMPLE 4

Using the concentrate of the threonine resin eluate used in Example 2, a drying test was conducted by a spray drier and a drum drier.

When the drying was conducted by the spray drier, the dried product stuck to the product separating cyclone, and it was impossible to conduct normal drying. On the other hand, although drying was possible to some extent with the drum drier, the water content of the product increased to 5.7% and also heat degeneration was violent.

Therefore, the filter mat drier- and drum drier-dried products were evaluated for heat degeneration, to obtain the results shown in Table 3.

TABLE 3

| Evaluated Product | Ai |
|---|---|
| Resin eluate concentrate | 1.1 |
| Filter mat drier-dried product | 1.3 |
| Drum drier-dried product | 3.5 |

(Ai: Absorbance at 420 nm of 5 g of the solids diluted with water to 100 cc)

It can be seen that the filter mat drier-dried product has very low heat degeneration.

EXAMPLE 5

In 70 kl of the threonine fermentation liquor obtained in Example 1 was dissolved 350 kg of calcium hydroxide to adjust the pH to 9. This solution was concentrated under the same conditions as in Example 1, and thereafter the drying was conducted by a filter mat drier method (FMD).

The hygroscopicity of the threonine composition thus obtained was compared with the product of Example 1. The results are shown in Table 4.

TABLE 5

| Sample | Absorbed water content (%) at 40° C., RH 70% |
| --- | --- |
| Threonine dried product of Example 1 | 20% |
| Threonine dried product of Example 5 | 10% |

It can be seen that the hygroscopicity has been improved by the addition of calcium hydroxide.

EXAMPLE 6

To a basal animal feed having a crude protein content of 12%, obtained by adding minerals such as calcium phosphate, sodium chloride etc., a vitamin mixture, 0.3% of L-Lys.HCl and 0.1% of DL-methionine as amino acids to a mixture of 87.0% of maize and 9.5% of defatted soybean, was added either the sample obtained in Example 2 in an amount corresponding to 0.1% of L-threonine or the sample obtained in Example 3 in an amount corresponding to 0.04% of L-tryptophan, and the nutrition effect on raised pigs was tested. The results are shown in Table 4.

TABLE 4

| | Testing Section | | |
| --- | --- | --- | --- |
| Sample | 1 Not Added | 2 Pure L-Trp (0.04%) Pure L-Thr (0.1%) | 3 Product of the Invention Added |
| Weight gain per day (g) | 430 | 620 | 621 |
| Amount of Feed taken per day (kg) | 1.20 | 1.50 | 1.50 |
| Feed requiring rate | 3.04 | 2.42 | 2.42 |

(Trp: tryptophan; Thr: threonine; Product of the invention: 0.04% as L-Trp and 0.1% as L-Thr)

Testing Method

Using 8 raised pigs (4 male castrated pigs and 4 female pigs) per section, the change in the average weight gain was measured when feeding for 28 days (from an initial body weight of 18 kg to 35 kg).

The product of the present invention, similar to that incorporating pure tryptophan and pure threonine, exhibited improvement in the weight gain per day and the feed requiring rate.

Effect of the Invention

As is clear from the above description, the present invention can produce a granular animal feed composition having excellent product stability and powder physical properties with less heat degeneration starting from a tryptophan or threonine solution at a low cost.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for production of a composition for animal feed, which consists essentially of:
    spray drying an impure solution of tryptophan or threonine in crude form which is not isolated or purified containing 20-60 wt. % based on the solids content of said solution of tryptophan or threonine, or a concentrate thereof, to produce sprayed granules in a semi-dry state having a moisture content of 5-15%,
    depositing said sprayed granules in a filter mat drier, and
    hot air drying said deposited granules under conditions effective to produce a granular product with low heat degeneration having a water content of about 4 wt. % or less.

2. A process according to claim 1, wherein a culture medium of a microorganism is used as said tryptophan or threonine solution.

3. A process according to claim 1, wherein a resin adsorption eluate is used as said tryptophan or threonine solution.

4. A process according to claim 1, wherein a crystallization mother liquor is used as the tryptophan or threonine solution.

5. A process according to claim 1, wherein an enzymatic reaction mixture is used as said tryptophan or threonine solution.

6. A process according to claim 1, wherein said sprayed granules are deposited in a mat having a thickness of from 5-30 mm.

7. A process according to claim 1, wherein said sprayed granules obtained by spray drying have a water content of from 7-9%.

8. A process according to claim 1, wherein the drying of the deposited spray granules is conducted using hot air at a temperature of from 50°-80° C.

9. A process according to claim 1, wherein said solution containing 5-95 wt. % based on the solids content of said solution of tryptophan or threonine or a concentrate thereof, has a pH adjusted to between 8 and 10 by the addition of calcium hydroxide.

* * * * *

UNITED STATES PATENT AND TRADEMARK OFFICE
CERTIFICATE OF CORRECTION

PATENT NO. : 4,777,051
DATED : Oct. 11, 1988
INVENTOR(S) : Yoshimi NAGANO et al.

It is certified that error appears in the above-identified patent and that said Letters Patent is hereby corrected as shown below:

On the Title Page, Item [30]:

Please add the following to the Foreign Application Priority Data:

-- Dec. 17, 1986 [JP] Japan ................ 61-300828 --

Signed and Sealed this

Fourteenth Day of March, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,777,051

DATED : October 11, 1988

INVENTOR(S) : YOSHIMI NAGANO ET AL

It is certified that error appears in the above-identified patent and that said Letters Patent is hereby corrected as shown below:

Column 3, line 9, change "cell free" to --cell-free--.

Column 7, line 3, change "The results are shown in Table 4" to --The results are shown in Table 5--.

Signed and Sealed this

Twelfth Day of June, 1990

Attest:

HARRY F. MANBECK, JR.

*Attesting Officer*    *Commissioner of Patents and Trademarks*